United States Patent Office 3,230,087
Patented Jan. 18, 1966

3,230,087
LIGHT-SENSITIVE POLYMERIC DIAZONIUM AND AZIDOACRYLAMIDO REPRODUCTION MATERIALS AND PROCESS FOR MAKING PLATES THEREFROM
Oskar Sus and Kurt Reiss, Wiesbaden-Biebrich, Germany, assignors, by mesne assignments, to Azoplate Corporation, Murray Hill, N.J.
No Drawing. Original application Feb. 25, 1960, Ser. No. 10,887, now Patent No. 3,174,860. Divided and this application June 25, 1964, Ser. No. 378,027
Claims priority, application Germany, Feb. 26, 1959, K 37,093
19 Claims. (Cl. 96—33)

This application is a division of copending application Serial No. 10,887, filed February 25, 1960, now U.S. Patent No. 3,174,860.

It has already been suggested to prepare printing plates by coating suitable base materials with light-sensitive high-molecular weight diazo compounds, obtained by reacting diazo diphenylamine with formaldehyde. However, the compounds thus produced do not satisfy all demands made of them with regard to the development thereof.

Now light-sensitive reproduction material has been discovered comprising at least one polymeric substituted acrylic acid amide compound corresponding to the following compound:

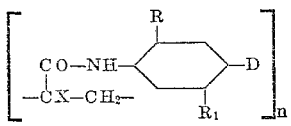

in which R and $R_1$ are alkoxy groups; D is an azido group, or a diazonium salt group, or a diazo sulfonate group; $n$ is an integer greater than 1; and X is hydrogen or methyl.

Among the diazonium salt groups representing group D in the above formula, the diazonium chloride group, or the zinc chloride double salt of the diazonium chloride group are preferred; alternatively, D may be another diazonium salt, e.g., diazonium borofluoride. A reaction of the diazonium group with sodium sulfite leads to diazo sulfonates, another alternative for group D.

The polymeric diazo and azido compounds of substituted acrylic acid amides are obtained by polymerizing, preferably in a solvent, acrylic acid amides which are substituted at the nitrogen atom of the amide group by a p-nitrophenyl radical substituted by alkoxy groups in the 2- and 5-positions, using one of the conventional radical-forming agents in the polymerization process, such as peroxide or azo compounds, e.g., dibenzoyl peroxide, dicumene hydroperoxide, di-tert.-butyl peroxide or azo-isobutyric acid dinitrile. It may be of advantage to effect polymerization in very dilute solutions, using, e.g., sufficient solvent so that the solution contains only from 1–25 percent, preferably from 5–20 percent by weight, of the monomeric compound. Polymerizates which do not precipitate by themselves are obtained by adding a precipitating agent or by distilling the solvent off. The substituted polymeric acrylic acid amides containing nitro groups are reduced to the corresponding amino compounds, using, e.g., hydrogen and a metal catalyst, such as Raney nickel. By treatment with a metal nitrite, especially with an alkali metal nitrite, such as sodium nitrite or potassium nitrite, in an acidic solution, or with an organic nitrite, e.g., iso-amyl nitrite, polymeric diazo compounds are obtained from said polymeric amino compounds. The corresponding polymeric azides can be prepared by the reaction of an inorganic azide with the diazonium compounds. In many cases, it is possible to facilitate precipitation of the diazonium compounds and obtain more stable end products by converting them into double salts, e.g., zinc chloride double salts, or into diazo sulfonates, by means of sodium sulfite.

The monomeric acrylic acid amides which carry nitrophenyl groups as substituents at the nitrogen atom of the amide groups, are prepared by the reaction of acrylic acid chloride with the respective amines. Instead of acrylic acid chloride, there may be used methacrylic acid chloride. It was surprising to discover that acrylic acid amides substituted by aromatic rings carrying nitro groups can be easily polymerized because, in general, negative substituents at the hydrogen atom of the nitrogen atom of the amide group impede polymerization.

The polymeric diazo and azido compounds, respectively, according to the present invention are particularly suited for the preparation of light-sensitive layers on suitable base materials which are to be used for making photomechanical reproductions.

The light decomposition products thereof are capable of tanning colloids and have oleophilic character. The tanned images obtainable by exposure of the sensitized material through a master may be used for the preparation of flat and intaglio printing plates or screen stencils. The novel diazo compounds are amorphous, water-soluble, yellow compounds which have substantive properties, i.e., they adhere very well to cellulosic base materials such as, e.g., paper or cellulose hydrate films, and are thus particularly suited for the production of water-fast blue prints, especially by the so-called semiwet process, in which the azo component is applied from an aqueous solution to the paper after exposure thereof.

For the preparation of the light-sensitive layers, the diazo compounds, either in the form of their water-soluble salts or double salts, such as the chlorides, boron fluorides, zinc chloride double salts, or in the form of their water-soluble sulfonates, are applied by known methods to the base materials from an aqueous solution, which in addition may contain colloids or other additives, e.g., stabilizers. If azides are used, they are applied in organic solvents, e.g., alcohols. The solutions may be applied by means of rollers. Alternatively, the base material may be passed through the solution or the solution may be cast or sprayed onto the base material; subsequently, the layer is dried. Suitable base materials are metal foils, e.g., aluminum, copper or zinc foils, and sheets of paper or plastics, e.g., polyamides or cellulose derivatives, such as cellulose acetate or cellulose hydrate. For the preparation of flat printing plates, the coated base material is exposed through a master and then developed by treating the exposed plate with water to which some acid has been advantageously added. In order to remove minor quantities of the diazo compound which may have been adsorbed by the base material, aqueous alkaline solution are used which contain azo components with water-solubilizing groups.

The azo dyestuff which forms enhances the hydrophilic properties of the foil in the unexposed areas.

Intaglio printing plates are obtained by the methods customarily applied in photomechanical reproduction processes by a transfer of the tanned images produced on gelatine paper onto copper plates or cylinders. In this process, the products of the present invention are added to the gelatine as the tanning component.

For the preparation of screen stencils, tanning images are produced analogously to known methods on base materials consisting of screen-like metal or other fabrics by means of the products according to the present invention and the unexposed parts of the layer are then removed by rinsing with water, as usual.

Blue prints may be prepared by conventional methods, either by a dry development of an exposed polymeric material containing the diazo compounds according to the present invention and azo components, or by a semi-wet process by which the azo component is applied to the exposed paper.

The products according to the present invention may be used in admixture with each other or with other light-sensitive substances.

It is one of the advantages of the polymeric diazo and azido compounds of substituted acrylic acid amides that, in addition to their excellent tanning quality, they adhere very fast and evenly to cellulosic base materials, such as paper or cellulose hydrate films, because of their hydrophilic properties and that they practically lose these hydrophilic properties and become strongly oleophilic upon exposure. This fact causes an excellent differentiation between the light decomposition products and the undecomposed compounds which, in turn, leads to particularly long runs when using the compounds of the present invention for the production of printing plates.

The following examples describe the preparation of the polymeric diazo and azo compounds according to the present invention:

*Example 1*

For the preparation of the zinc double salt of polymeric 2 - acroylamino-hydroquinone-diethylether-5-diazonium- chloride, 18.1 parts by weight of 2-amino-hydroquinone-diethylether are dissolved in 100 parts by volume of dioxane. To this solution there are slowly added, drop by drop, first a solution of 10 parts by weight of acroyl chloride in 10 parts by volume of dioxane and then a solution of 12.7 parts by weight of anhydrous sodium carbonate in 125 parts by volume of water. A weakly alkaline reaction of the reaction mixture must be maintained. Subsequently, the mixture is heated to 70–80° C. and agitated for 2 hours at this temperature. Thereafter, the reaction mixture is poured into 500 parts by volume of water, while agitating. The precipitating 2-acroylamino-hydroquinone-diethylether is separated by suction and recrystallized from dilute alcohol. 17.5 parts by weight (=75 percent of the theoretical yield) of a colorless substance are obtained which has a melting point of 123° C.

For the nitration of this compound, 11.5 parts by weight of 2-acroylamino-hydroquinone-diethylether are dissolved in 150 parts by volume of glacial acetic acid. The mixture is cooled down to 10° C. and then 9 parts by volume of nitric acid, having a density of 1.3 are cautiously added. The nitro compound is precipitated by pouring the reaction mixture into 500 parts by volume of water. For purification, the compound is recrystallized from a 1:2 mixture of alcohol and water. 13 parts by weight (=94 percent of the theoretical yield) of 2-acroylamino-5-nitrohydroquinone-diethylether are obtained, which has a melting point of 108° C.

For polymerization, 10 parts by weight of 2-acroylamino-5-nitrohydroquinone diethylether are dissolved in 50 parts by volume of ethyleneglycol monomethylether, 0.5 part by weight of azoisobutyric acid dinitrile is added, and the reaction mixture is heated for 8 hours to the boiling point, with the exclusion of air by means of nitrogen. Subsequently the reaction mixture is cooled, thus precipitating part of the polymerization product. Precipitation is completed by adding 200 parts by volume of alcohol. The polymerization product is separated by suction and then washed with some alcohol in order to remove any monomers which may be left. In this manner, 7.8 parts by weight (=78 percent of the theoretical yield) of poly-2-acroylamino-5-nitrohydroquinone diethylether are obtained which has a melting range from 160–183° C.

In order to reduce the compound, 28 parts by weight of poly-2-acroylamino-5-nitrohydroquinone diethylether are suspended in 200 parts by volume of ethyleneglycol monomethylether and then reduced to form the corresponding amino compound at a temperature of 100° C. and 80 atmospheres excess pressure with hydrogen, using Raney nickel as a catalyst.

26.5 parts by weight of the amino compound (=94 percent of the theoretical yield) are thus obtained; the compound melts in the range from 150–160° C.

For the production of the polymeric diazo compound, 8.5 parts by weight of poly-2-acroylamino-5-aminohydroquinone diethylether are dissolved in a mixture consisting of 40 parts by volume of concentrated hydrochloric acid and 50 parts by volume of water and then diazotized by slowly adding 8.1 parts by volume of a 40 percent aqueous sodium nitrite solution. The reaction mixture is filtered by means of active charcoal and precipitated in the form of its zinc chloride solution. 9 parts by weight of the zinc chloride double salt of poly-2-acroylaminohydroquinone-diethylether - 5 - diazonium chloride are thus obtained.

*Example 2*

For the preparation of the polymeric diazo sulfonate of 2-acroylamino-hydroquinone-diethylether - 5 - diazonium chloride, 12.5 parts by weight of polyacroylamino-5-amino-hydroquinone-diethylether, which has been prepared by the method described in Example 1, are dissolved in 175 parts by volume of a 1:1 mixture of water and hydrochloric acid. Some active charcoal is added to the reaction mixture which is then filtered, cooled to 0–5° C. and diazotized by adding 8.7 parts by volume of a 40 percent sodium nitrite solution. While agitating, the solution of the diazonium salt is cautiously added to a solution containing 79 parts by weight of sodium carbonate and 6.3 parts by weight of sodium sulfite in 350 parts by volume of water. Precipitation of the sulfonate which forms is completed by adding a saturated common salt solution; 18 parts by weight (=100 percent of the theoretical yield) are obtained of an egg yolk colored powder.

*Example 3*

For the preparation of the azide of poly-2-acroylamino-hydroquinone - diethylether-5-diazonium chloride, the poly-2-acroylamino - 5 - amino-hydroquinone-diethylether, prepared in accordance with Example 1, is diazotized as described in Example 2 and the reaction mixture thus obtained is cautiously added to an aqueous sodium azide solution using 2.5 moles of the sodium azide solution per mole of the diazotization mixture. The high molecular weight azide which precipitates is separated by suction and dried under reduced pressure. It is obtained in a quantity which corresponds to 98 percent of the theoretical yield and forms a white powder with a brownish tinge which has no definite melting point. When heated to 140–150° C. the compound decomposes without melting.

*Example 4*

For the preparation of the polymeric 2-methacroylamino-hydroquinone - diethylether-5-diazonium chloride-cadmium chloride double salt, 18.1 parts by weight of 2-amino-hydroquinone-diethylether are dissolved in 100 parts by volume of dioxane. To this solution there are simultaneously added slowly a solution of 11.5 parts by weight of methacroylchloride in 10 parts by volume of dioxane and a solution of 12.7 parts by weight of anhydrous sodium carbonate in 125 parts by volume of water. Care must be taken, that the reaction mixture constantly shows a slightly alkaline reaction (pH value of about 8). The mixture is subsequently heated over a bath having a temperature of 70–80° C. and agitated for 2 hours at this temperature. Subsequently, the reaction mixture is poured into 500 parts by volume of ice water with agitation. The 2-methacroylamino - hydroquinone-diethylether precipitates in the form of an oily product which solidifies when left standing in ice. The isolated raw product is digested with 18 percent hydrochloric acid. 21.5 parts by weight, corresponding to 85 percent of the theoretical yield, of the crude product, free from diazotizable components and having a melting point of 37–38° C. are thus obtained. After recrystallization from dilute methanol, the substance melts at 41° C.

For the introduction of the nitro group, 21 parts by weight of 2-methacroylamino-hydroquinone-diethylether are dissolved in 150 parts by volume of glacial acetic acid. Nitration is effected by adding, at 10° C., a solution of 6.5 parts by weight of nitric acid ($D=1.42$) in 10 parts by volume of glacial acetic acid. The solution thus obtained turns yellow when heated. The nitro compound is precipitated by adding 50 parts by volume of water. For purification, it is dissolved in a hot mixture of 250 parts by volume of alcohol and 50 parts by volume of water and filtered, with the addition of activated carbon.

Upon recrystallization, the compound forms yellow needles. 10.5 parts by weight of 2-methacroylamino-5-nitro-hydroquinone-diethylether of a melting point of 110° C. are thus obtained.

For polymerization of the nitro compound, 9.5 parts by weight of 2-methacroylamino-5-nitrohydroquinone-diethylether are dissolved in 70 parts by volume of ethyleneglycol monomethylether, 0.1 part by weight of azoisobutyric acid dinitrile are added and the reaction mixture is heated for 7 hours to the boiling point while nitrogen is passed through. Subsequently, the solution is concentrated and twice digested each time with 100 parts by volume of alcohol in order to remove the starting material. 2.4 parts by weight of poly-2-methacroylamino-5-nitro-hydroquinone-diethylether are thus obtained, which melts in the range of from 100–130° C.

For the reduction of the nitro compound, 2.4 parts by weight of poly-2-methacroylamino-5-nitro-hydroquinone-diethylether are dissolved in 150 parts by volume of dioxane and then reduced at 90° C., by means of hydrogen and using Raney nickel as a catalyst to form the corresponding amino compound. After the solvent has been distilled off under reduced pressure, 2.1 parts by weight of the amino compound are obtained in the form of a dark oil.

For the production of the polymeric diazo compound, 2.1 parts by weight of the oil are twice digested each with 15 parts by volume of an about 30 percent hydrochloric acid and then diluted each time with 15 parts of water. After filtration, the solution is diazotized by cautiously introducing 1 part by volume of an aqueous 2-n-sodium nitrite solution. The reaction mixture is filtered over active carbon and then precipitated in the form of its cadmium double salt by adding a 10 percent cadmium chloride solution. 0.6 part by weight of the poly-2-methacroylamino-hydroquinone-diethylether-5-diazonium chloride-cadmium chloride double salt are thus obtained.

Example 5

Polymeric 2-methacroylamino-hydroquinone-dimethylether-5-diazonium chloride, is prepared by analogy to the method described in Example 4. As described in Example 4, a solution of 15.3 parts by weight of 2-aminohydroquinone-dimethylether in 100 parts by volume of dioxane is reacted with the solutions of 11.5 parts by weight of methacrylchloride in 10 parts by volume of dioxane and of 12.7 parts by weight of anhydrous sodium carbonate in 125 parts by volume of water. The 2-methacroylamino-hydroquinone-dimethylether thus formed is contained in the solvent layer on top. By adding ether, the aqueous layer is separated. After removal of the starting material still present, the ether layer with the dioxane content is twice extracted with 10 percent hydrochloric acid. After the solvent has been distilled off, 15.2 parts by weight of 2-methacroylamino-hydroquinone-dimethylether are obtained. In order to introduce the nitro group, 13.3 parts by weight of 2-methacroylamino-hydroquinone-dimethylether are dissolved in 30 part by volume of glacial acetic acid and 6.4 parts by volume of nitric acid ($D=1.42$), dissolved in 5 parts by volume of glacial acetic acid, are slowly added at a temperature of 25 to 30° C. The nitro compound precipitates in the form of brownish-yellow crystals. For purification, the crude product is recrystallized from ethanol. 7.4 parts by weight of 2-methacroylamino-5-nitro-hydroquinone-dimethylether, of the melting point of 147° C., are thus obtained in the form of yellow needles.

For polymerization, 6.3 parts by weight of 2-methacroylamino-5-nitro-hydroquinone-dimethylether are dissolved in 60 parts by volume of benzene, and 0.9 part by weight of azoisobutyric acid dinitrile is added to the solution. Under a reflux condenser and while agitating, the yellow solution is heated for 7 hours to the boiling point in a nitrogen atomsphere. The polymerization product precipitates in the form of a resin which, contrary to the monomeric compound, is insoluble in alcohol. After removal of the solvent there remain 5.3 parts by weight of poly-2-methacroylamino-5-nitro-hydroquinone-dimethylether.

In order to reduce the nitro compound, 5.3 parts by weight of poly-2-methacroylamino-5-nitro-hydroquinone-dimethylether are dissolved in 200 parts by volume of dioxane. After adding 10 parts by weight of Raney nickel, the dissolved compound is hydrated at 100° C. in an autoclave. After filtration, the dioxane is removed by distillation under reduced pressure. 5.0 parts by weight of poly - 2 - methacroylamino-5-amino-hydroquinone-dimethylether are thus obtained in the form of a brown oil.

For the preparation of the polymeric diazo compound, 5.0 parts by weight of the oil are dissolved in 28 parts by volume of 18 percent hydrochloric acid and the solution is diluted with water until 60 parts by volume are obtained. The solution is filtered and then 5 parts by volume of a 2-n-sodium nitrite solution are added at temperatures below 5° C. The solution is filtered by means of active carbon and the diazo compound is precipitated in the form of its cadmium double salt by adding 35 parts by volume of a 17 percent cadmium chloride solution. 2.4 parts by weight of poly-2-methacroylamino-hydroquinone-dimethylether-5-diazonium chloride are thus obtained in the form of the cadmium chloride double salt.

The following examples illustrate the application of the above described products.

Example 6

A commercially available paper foil, suited for the production of printing plates, is coated with a 0.5–1.5 percent aqueous solution of the zinc chloride double salt of the diazo compound according to Example 1 and dried by means of a current of warm air. The thus sensitized foil is exposed through a master using, e.g., an arc lamp or a fluorescent tube. For development of the latent image, the foil is treated with a 1 percent solution of phenylmethyl-pyrazolone-sulfonic acid in 1 percent sodium carbonate solution, which in 100 parts by volume of the liquid contains 1 part by volume of a 0.5 percent solution of a wetting agent (a reaction product of phenol and ethyleneoxide). Instead of the phenylmethyl-pyrazolone-sulfonic acid just mentioned, there may be used one of the following sulfonic acids: 2-hydroxy-naphthalene-3,6 - disulfonic acid, 1,8-diamino-naphthalene-3,6-disulfonic acid, 1-amino-8-naphthol-2,4-disulfonic acid or 1,8-dihydroxy-naphthalene-2,4-disulfonic acid. After development, the foil is briefly rinsed with water and then clamped to a printing apparatus operating on the offset principle. After inking with greasy ink, the foil may be used for printing. The prints obtained are negative with regard to the master used.

Example 7

An aluminum foil is coated with a 0.3 percent solution of the zinc chloride double salt of the diazo compound according to Example 1 in a 3 percent aqueous solution of polyvinylalcohol and dried by means of a current of warm air. After exposure through a master, the foil is developed by rinsing with water and then treated according to the method described in Example 6. Negative printing plates of the master are obtained. Instead of polyvinylalcohol other colloids may also be used, e.g. polyvinyl pyrrolidone, methylcellulose, gelatine and tragacanth. All the other polymeric diazo compounds mentioned in the description, as well as mixtures thereof, may be used in a similar manner as light sensitive components for hardening colloid layers.

*Example 8*

A raw paper suited for the preparation of blue prints is coated with an aqueous solution containing 1.75 percent of the diazo compound according to Example 7, 0.5 percent of citric acid, and 0.5 percent of aluminum sulfate, and dried. After exposure through a master, the image thus produced, which corresponds to the master used and is of excellent fastness to humidity and diffusion, is developed with a commercially available wet developing agent which contains phloroglucinol as the azo component.

The other diazonium salts and double salts mentioned in the description and their mixtures with each other may be similarly used for the production of copies by a semi-wet process.

*Example 9*

0.2 part by weight of the azide of poly-2-acroylamino-hydroquinone-diethylether-5-diazonium chloride (see Example 3) and 2 parts by weight of polyvinyl pyrrolidone are dissolved in 100 parts by volume of ethyleneglycol monomethylether and the solution is coated onto an aluminum foil, one side of which has been roughened. A latent tanning image is obtained by exposing the light sensitive foil under a master to the light of an arc lamp. By treating the exposed foil with water, the layer is removed in the unexposed areas. The image may be made visible by dyeing, e.g., with a water soluble dye, such as methylene blue. Development and the dyeing process may be effected in one bath. An image is thus obtained which is negative with regard to the master used.

*Example 10*

An aqueous solution containing 1.7 parts by weight of the poly - 2 - methacroylamino-hydroquinone-diethylether-5-diazonium chloride-cadmium chloride double salt, obtained according to the method described in Example 4, 0.5 percent of citric acid and 0.5 percent of aluminum sulfate, is coated onto a raw paper customarily used for the production of blue prints, and dried. After exposure under a positive original, the positive image thus obtained is developed with a soda-alkaline developer containing 2-oxy-3-naphthoic acid ethanol amide. The blue-violet copies thus obtained show no traces of bleeding of the dyestuffs.

*Example 11*

Analogously to the method described in Example 6, a paper printing foil is coated with a 1.5 percent aqueous solution of poly - 2 - methacroylamino-hydroquinone-dimethylether - 5 - diazonium chloride-cadmium chloride double salt and then dried. After exposure under a negative original, the foil is wiped over with a 1 percent soda-alkaline aqueous solution of phenylmethyl pyrazolone sulphonic acid, briefly rinsed with water and then inked with greasy ink. A positive printing plate is thus obtained.

Alternatively, the diazo compound may be used for the production of blue prints by the method described in Example 10. For this purpose, e.g., a 1.7 percent aqueous solution of poly - 2 - methacroylamino-hydroquinone-dimethylether - 5 - diazonium chloride-cadmium chloride double salt, containing also 0.5 percent of citric acid and 0.5 percent of aluminum sulfate, is coated onto a raw paper customarily used for the preparation of blue prints. After drying, the paper is exposed under a transparent positive original. Development of the image is advantageously performed by means of a 1 percent soda alkaline solution of 2,3-dihydroxy naphthalene. A positive image of a red-violet color is obtained.

It will be obvious to those skilled in the art that many modifications may be made within the scope of the present invention without departing from the spirit thereof, and the invention includes all such modifications.

What is claimed is:

1. A compound having the formula

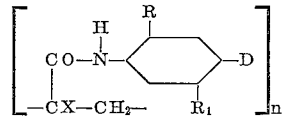

in which R and $R_1$ are alkoxy groups, D is selected from the group consisting of an azido group, a diazonium salt group and a diazo sulfonate group, $n$ is an integer greater than 1, and X is selected from the group consisting of hydrogen and methyl groups.

2. Polymeric 2 - acroylamino - hydroquinone - diethylether-5-diazonium chloride zinc chloride double salt.

3. Polymeric 2 - acroylamino - hydroquinone - diethylether-5-diazo-sulfonate.

4. Polymeric 2 - acroylamino - hydroquinone - diethylether-5-azide.

5. Polymeric 2 - methacroylamino - hydroquinone - diethylether-5-diazonium chloride-cadmium chloride double salt.

6. Polymeric 2 - methacroylamino - hydroquinone - dimethylether-5-diazonium chloride-cadmium chloride double salt.

7. Light-sensitive material comprising a base material having a coating thereon comprising a compound having the formula

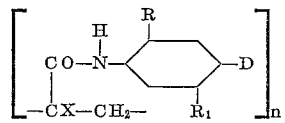

in which R and $R_1$ are alkoxy groups, D is selected from the group consisting of an azido group, a diazonium salt group and a diazo sulfonate group, $n$ is an integer greater than 1, and X is selected from the group consisting of hydrogen and methyl groups.

8. Light-sensitive material according to claim 7 in which the coating includes an organic colloid.

9. Light-sensitive material according to claim 7 in which the coating comprises polymeric 2-acroylamino-hydroquinone - diethylether - 5 - diazonium chloride zinc chloride double salt.

10. Light-sensitive material according to claim 7 in which the coating comprises polymeric 2-acroylamino-hydroquinone-diethylether-5-diazo-sulfonate.

11. Light-sensitive material according to claim 7 in which the coating comprises polymeric 2-acroylamino-hydroquinone-diethylether-5-azide.

12. Light-sensitive material according to claim 7 in which the coating comprises polymeric 2-methacroylamino - hydroquinone-diethylether-5-diazonium chloride-cadmium chloride double salt.

13. Light-sensitive material according to claim 7 in which the coating comprises polymeric 2-methacroylamino-hydroquinone-dimethylether-5-diazonium chloride-cadmium chloride double salt.

14. A process for exposing and developing light-sensitive material which comprises exposing a supported light-sensitive layer to light under a master and treating the exposed layer with a developer, the layer comprising a compound having the formula

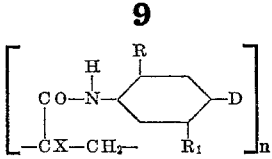

in which R and $R_1$ are alkoxy groups, D is selected from the group consisting of an azido group, a diazonium salt group and a diazo sulfonate group, $n$ is an integer greater than 1, and X is selected from the group consisting of hydrogen and methyl groups.

15. A process according to claim 14 in which the compound is polymeric 2-acroylamino-hydroquinone-diethylether-5-diazonium chloride zinc chloride double salt.

16. A process according to claim 14 in which the compound is polymeric 2-acroylamino-hydroquinone-diethylether-5-diazo-sulfonate.

17. A process according to claim 14 in which the compound is polymeric 2-acroylamino-hydroquinone-diethylether-5-azide.

18. A process according to claim 14 in which the compound is polymeric 2-methacroylamino-hydroquinone-diethylether-5-diazonium chloride-cadmium chloride double salt.

19. A process according to claim 14 in which the compound is polymeric 2-methacroylamino-hydroquinone-dimethylether - 5 - diazonium chloride-cadmium chloride double salt.

References Cited by the Examiner
UNITED STATES PATENTS

| | | | |
|---|---|---|---|
| 1,934,011 | 11/1933 | Schmidt et al. | 96—75 |
| 2,063,832 | 12/1936 | Werner | 96—49 |
| 2,274,551 | 2/1942 | Kenyon et al. | 96—115 X |
| 2,405,523 | 8/1946 | Sease et al. | 96—75 |
| 3,016,298 | 1/1962 | Sanders et al. | 96—91 X |

NORMAN G. TORCHIN, *Primary Examiner.*